United States Patent
Kathe et al.

(10) Patent No.: US 11,397,141 B2
(45) Date of Patent: Jul. 26, 2022

(54) METHOD FOR DILUTING A SAMPLE LIQUID AND DILUTION UNIT FOR A SUBSEQUENT ANALYSIS

(71) Applicant: Endress+Hauser Conducta GmbH+Co. KG, Gerlingen (DE)

(72) Inventors: Ulrich Kathe, Ludwigsburg (DE); Ulrich Rottensteiner, Stuttgart (DE); Daniel Schweitzer, Remshalden (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 207 days.

(21) Appl. No.: 16/703,007

(22) Filed: Dec. 4, 2019

(65) Prior Publication Data
US 2020/0182756 A1    Jun. 11, 2020

(30) Foreign Application Priority Data
Dec. 5, 2018    (DE) .................... 10 2018 131 061.7

(51) Int. Cl.
*G01N 1/38*    (2006.01)
*G01N 1/18*    (2006.01)
*G01N 35/10*    (2006.01)
*G01N 35/00*    (2006.01)

(52) U.S. Cl.
CPC ............. *G01N 1/38* (2013.01); *G01N 1/18* (2013.01); *G01N 35/1002* (2013.01); *G01N 2001/386* (2013.01); *G01N 2035/00465* (2013.01)

(58) Field of Classification Search
None
See application file for complete search history.

(56) References Cited

U.S. PATENT DOCUMENTS

| | | | |
|---|---|---|---|
| 2004/0191124 A1* | 9/2004 | Noetzel ............. | B01L 3/502746 422/69 |
| 2007/0246426 A1 | 10/2007 | Collins | |
| 2014/0356977 A1* | 12/2014 | Hanko ..................... | G01N 1/38 422/69 |
| 2017/0173532 A1 | 6/2017 | Ide et al. | |

(Continued)

FOREIGN PATENT DOCUMENTS

| | | |
|---|---|---|
| DE | 1545413 A1 | 1/1970 |
| DE | 2419861 A1 | 11/1974 |
| DE | 234437 A1 | 4/1986 |

(Continued)

*Primary Examiner* — Kathryn Wright
(74) *Attorney, Agent, or Firm* — Christopher R. Powers; Endress+Hauser (USA) Holding Inc.

(57) ABSTRACT

The present disclosure relates to a method for diluting a sample liquid taken from a sampling point for the subsequent determination of a parameter which depends on a concentration of at least one analyte in the sample liquid, including: supplying a first quantity of the sample liquid to a mixing device via a first sample liquid line; supplying a second quantity of the sample liquid to a separator via a second sample liquid line; separating the analyte from the second quantity of the sample liquid supplied to the separator by means of the separator to obtain a dilution liquid that no longer contains the analyte, and mixing at least one portion of the first quantity of the sample liquid supplied to the mixing device via the first sample liquid line with at least one portion of the dilution liquid by means of the mixing device.

21 Claims, 2 Drawing Sheets

(56) References Cited

U.S. PATENT DOCUMENTS

2017/0321505 A1* 11/2017 Murphy ................. E21B 21/01

FOREIGN PATENT DOCUMENTS

| | | |
|---|---:|---:|
| DE | 69419253 T2 | 10/1999 |
| DE | 10232812 A1 | 2/2004 |
| DE | 10305050 A1 | 8/2004 |
| DE | 102009014576 A1 | 9/2010 |
| DE | 102016105770 A1 | 10/2017 |
| EP | 0046390 B1 | 12/1984 |
| EP | 2318123 B1 | 11/2011 |
| GB | 656584 | 8/1951 |

* cited by examiner

METHOD FOR DILUTING A SAMPLE LIQUID AND DILUTION UNIT FOR A SUBSEQUENT ANALYSIS

CROSS-REFERENCE TO RELATED APPLICATION

The present application is related to and claims the priority benefit of German Patent Application No. 10 2018 131 061.7, filed on Dec. 5, 2018, the entire contents of which are incorporated herein by reference.

TECHNICAL FIELD

The present disclosure relates to a method for diluting a sample liquid and to a dilution unit for a subsequent analysis.

BACKGROUND

In laboratory or process analysis technology, substances, for example, liquids, are analyzed qualitatively and quantitatively. In qualitative analysis, ingredients contained in a solid, gaseous, or liquid sample are identified. In quantitative analysis, a quantitative proportion, for example, a concentration, of a specific ingredient in the sample is determined. The ingredient whose proportion of the sample is determined is also referred to as an analyte. In addition to concentrations of individual analytes, it is also possible to determine sum parameters whose value depends on the proportion of a plurality of analytes in the sample. Examples of such sum parameters are chemical oxygen demand (COD), total nitrogen content (TN), or the spectral absorption coefficient (SAC).

For the analysis of sample fluids in the laboratory or in process analysis technology, dilution of the sample liquids to be examined may be useful, for example, in order to obtain correct results even for liquids with high analyte concentrations despite a limited measuring range of a measuring device used for the analysis (e.g., a measuring probe or an automatic analysis apparatus). The sample liquid to be analyzed is diluted with a dilution liquid, for example, with water or another solvent miscible with the liquid to be analyzed.

The required degree of dilution of the sample liquid for the subsequent quantitative analysis by a measuring device can be determined by dividing the measuring range end of the measuring device by the expected concentration of the analyte in the sample liquid. The obtained result corresponds to the dilution ratio to be applied.

If such an analysis method with dilution of the sample liquid is performed routinely, for example, for long-term monitoring of an industrial process with several measurements per hour, a considerable demand for dilution medium may arise. This situation occurs, for example, in environmental metrology or in process metrology, e.g., in the field of treatment and cleaning processes in drinking water or wastewater treatment. Often used there are measuring devices which operate completely automatically and which extract a liquid sample from the process or a body of water at regular time intervals and determine one or more parameters correlating with a concentration of an analyte in the liquid sample. For detecting measured values, such measuring devices may, for example, have a measuring probe which is brought into contact with the liquid sample, or an automatic analysis apparatus. Some automatic measuring devices first produce a reaction mixture from the liquid sample by adding one or more reagents, and then carry out a measurement in the reaction mixture, for example, a measurement of the absorption or extinction of electromagnetic radiation, by means of which the value of the parameter to be monitored can be determined.

If the monitoring of a process by means of a completely automated measuring device requires a dilution of the sample liquid, a supply of dilution liquid must be made available to the measuring device. Two methods are customary for this purpose: On the one hand, the measuring device may be supplied with dilution liquid via a supply line, e.g., via a water line. If no such supply line is available, a storage container with dilution liquid may be made available to the measuring device, from which container the measuring device may remove a required quantity of dilution liquid by means of a pump. However, this solution is disadvantageous because the storage container requires additional space and must be regularly replaced or replenished. Supply lines are not available everywhere or require a high installation and maintenance cost.

SUMMARY

The object of the present disclosure is therefore to provide a method and a device for diluting a sample liquid for the subsequent determination of a parameter which depends on the concentration of at least one analyte in the sample liquid, which method and device avoid the disadvantages mentioned. The method and the device should especially do without an additional supply container or a supply line for dilution liquid.

This object is solved by a method according to claim 1 and by a dilution unit according to claim 10. Advantageous embodiments are listed in the dependent claims.

The method according to the present disclosure for diluting a sample liquid taken from a sampling point for the subsequent determination of a parameter which depends on a concentration of at least one analyte in the sample liquid comprises the following steps:

supplying a first quantity of the sample liquid to a mixing device via a first sample liquid line;

supplying a second quantity of the sample liquid to a separator via a second sample liquid line;

separating at least the analyte from the second quantity of the sample liquid supplied to the separator by means of the separator to obtain a dilution liquid which no longer contains the analyte, and mixing at least one portion of the first quantity of the sample liquid supplied to the mixing device via the first sample liquid line with at least one portion of the dilution liquid by means of the mixing device.

By obtaining the dilution liquid required for diluting at least one portion of the first quantity of the sample liquid from the second quantity of the sample liquid by means of the separator, an additional supply of dilution liquid, e.g., via a supply line or by providing a storage container with dilution liquid, may be omitted. The method can thus be used in a simple, cost-saving, and low-maintenance manner for a plurality of different applications, for example, for automated measuring devices, e.g., in the laboratory, for monitoring a process, or in environmental metrology.

The diluted sample liquid produced by means of the method can be supplied to an automatic measuring unit, for example, in a fully automated manner. The measuring unit can comprise, e.g., a measuring probe, e.g., a spectrometer or photometer probe, a pH probe, a conductivity probe, a dissolved oxygen probe, or an ion-selective electrode, which is brought into contact with the diluted sample liquid supplied to it in order to record a measured value of the parameter to be determined. The measuring unit can also be a component of an automatic analysis device which is designed to mix the diluted sample liquid with reagents in order to form a reaction mixture and/or to perform a thermal decomposition of substances contained in the diluted sample liquid and to then determine by means of the measuring unit a measured value of the sample liquid thus treated, from which measured value the value of the parameter can be derived. The measuring unit of automatic analysis devices often comprises an optical sensor, e.g., a photometric or spectrophotometric sensor. The diluted sample liquid may also be supplied to a chromatography device for qualitative or quantitative analysis.

The first quantity of the sample liquid may be passed through the first sample liquid line with a first mass or volume flow rate, and the second quantity of the sample liquid may be passed through the second sample liquid line with a second mass or volume flow rate, which is, for example, different from the first mass or volume flow rate. If the second mass or volume flow rate is higher than the first mass or volume flow rate, it is ensured that sufficient dilution liquid is available to be added in excess to the sample liquid to be analyzed. However, depending on the composition of the sample liquid, it is of course also possible to add a smaller volume of the dilution liquid to a specific volume of the sample liquid to be analyzed.

Separating at least the analyte from the second quantity of sample liquid may include, for example, splitting the second quantity of sample liquid into a dilution liquid substantially free of analyte and a residue containing the analyte. This can be done by means of a physical method, for example, a thermal or mechanical method, or by means of a chemical method. These methods may include, for example, filtering, precipitating, distilling, discharging water vapor and subsequent condensing, as well as separating the analyte by means of an ion exchanger.

Advantageously, separating at least the analyte from the second quantity of the sample liquid can be effected by distillation. In this embodiment of the method, depending on the composition of the sample liquid and type of analyte, the distillate or a fraction of the distillate can for example, serve as dilution liquid which no longer contains the analyte. It is also possible that the residue of the distillation serves as dilution liquid which no longer contains the analyte, for example, if the analyte is more readily volatile than the solvent in which the analyte is dissolved.

If the sample liquid contains water in which the analyte is dissolved and/or suspended, water can advantageously be obtained as dilution liquid from the second quantity of the sample liquid.

In this case, separating the analyte from the second quantity of sample liquid may comprise the steps of:
discharging water vapor from the sample liquid, optionally by heating the sample liquid; and
cooling the water vapor to form condensate, the condensate serving as dilution liquid.

The discharge of water vapor from the sample liquid can be effected, for example, by passing a gas, e.g., dry air or nitrogen, through the sample liquid and then cooling the water vapor-enriched gas passed through the sample liquid in order to condense the water vapor. In this case, the condensate thus obtained serves as dilution liquid. Advantageously, the gas passed through the sample liquid can be heated before entering the sample liquid. Additionally or alternatively, the sample liquid may be heated during passage of the gas.

In an alternative embodiment of the method, separating at least the analyte may comprise passing the sample liquid through an ion exchanger configured such that the analyte is sorbed by the ion exchanger, wherein the liquid leaving the ion exchanger after passage serves as dilution liquid. This may advantageously be done, for example, in the case of ammonium dissolved in water as analyte. In this case, a zeolite material, e.g., clinoptilolite, may serve as the ion exchanger.

The present disclosure also relates to a method for determining a parameter of a sample liquid which depends on the concentration of at least one analyte in the sample liquid, comprising:
taking sample liquid from a sampling point;
preparing diluted sample liquid by means of the method according to any of the above-described embodiments,
transporting at least one portion of the diluted sample liquid to a measuring unit; and
determining at least one measured value of the parameter by means of the measuring unit.

The method may further comprise the steps of:
producing a reaction mixture from the at least one portion of the diluted sample liquid and at least one reagent;
generating a measurement signal which represents a measured variable of the reaction mixture correlated with the parameter to be determined, by means of the measuring unit; and
deriving the measured value of the parameter from the measurement signal.

The reaction mixture can be formed in such a way that a reaction product is produced in the reaction mixture by reaction of the analyte with the reagent, which reaction product influences the measured variable which is represented by the measurement signal. The measured variable of the reaction mixture can be, for example, an optical measured variable, e.g., an absorption or extinction of measurement radiation irradiated into the reaction mixture, e.g., if the reaction product is an optically detectable, for example, colored, substance. This measured variable can be converted by a computer of the measuring unit into a value of the parameter to be determined, e.g., into an analyte concentration or into a value of a sum parameter, using a calibration function based on the Beer-Lambert law or on the basis of stored tables.

All method steps of the method described herein can be carried out in an automated manner by means of a control electronics. In order to carry out the described method, the control electronics can be designed and programmed to actuate pumps and valves of a dilution unit used for automatically performing the dilution method and of the measuring unit or analysis device and to control the measuring sensor of the measuring unit and to process its measurement signals in order to determine values of the parameter.

A dilution unit according to the present disclosure for an automatic measuring device for determining measured values of a parameter depending on the concentration of at least one analyte in a sample liquid comprises:
a first sample liquid line that is fluidly connectable to a sampling point containing the sample liquid;
a second sample liquid line that is fluidly connectable to the sampling point;
a separator fluidly connected to the second sample liquid line and configured to separate the at least one analyte from the sample liquid supplied to the separator via the second sample liquid line in order to produce a dilution liquid that no longer contains the at least one analyte;

an outlet for the dilution liquid connected to the separator;

a mixing device fluidly connected to the outlet of the separator and to the first sample liquid line; and means for transporting sample liquid to the separator and for transporting dilution liquid from the separator to the mixing device and for transporting sample liquid from the sampling point to the mixing device.

The means for transporting sample liquid to the separator and for transporting dilution liquid from the separator to the mixing device and for transporting sample liquid from the sampling point to the mixing device may comprise fluid lines, valves and pumps wherein the valves and pumps can preferably be actuated in an automated manner by a control electronics.

The separator may comprise a container fluidly connected to the second sample liquid line, for example, a heatable container, and a gas discharge line connecting the container to a condensation unit. This allows for the discharge of solvent, e.g., water, in the form of vapor from the sample liquid contained in the container, e.g., by means of distillation or by passing a gas through the sample liquid and enriching it with solvent vapor. The solvent vapor, e.g., water vapor, can be liquefied again by means of the condensation unit and obtained as dilution liquid.

The condensation unit may have a cooler for cooling gas supplied from the condensation unit via the gas discharge line, and a condensate container for collecting condensate from the cooled gas, the condensate container being fluidly connectable to the mixing device in order to supply the condensate thereto as dilution liquid.

The separator may further comprise a gas supply line, for example, a heatable gas supply line, that opens into the container.

The separator may alternatively or additionally comprise a heater interacting with the container.

If the at least one analyte is an ion, the separator may comprise an ion exchanger fluidly connected to the second sample liquid line and the outlet and sorbing the analyte.

The mixing device may comprise a mixing unit with means for actively and/or passively mixing the sample liquid and the dilution liquid. The mixing device may further comprise a first collecting container fluidly connected to the first sample liquid line and a second collecting container fluidly connected to the separator as well as means for withdrawing a predetermined first quantity of the sample liquid from the first collecting container and means for withdrawing a predetermined second quantity of the dilution liquid from the second collecting container. These means may comprise, for example, liquid lines, controllable pumps, controllable valves and/or one or more dosing containers for measuring a volume of the liquids.

An automatic measuring device for determining measured values of a parameter that depends on the concentration of at least one analyte in a sample liquid, comprises:

a dilution unit according to any of the above-described embodiments;

a measuring unit designed to record a measured value of the parameter;

means for transporting diluted sample liquid from the dilution unit to the measuring unit; and a control electronics designed to control the measuring device for performing the above-described method for determining a parameter of a sample liquid which depends on the concentration of at least one analyte in the sample liquid.

If the automatic measuring device comprises an automatic analysis device containing the measuring unit, it may further comprise at least one container with a reagent to be added to the diluted sample liquid in order to produce a reaction mixture and means for transporting the reagent from the container to the measuring unit. The means for transporting reagents and sample liquid comprise, for example, fluid lines as well as controllable valves and/or pumps.

BRIEF DESCRIPTION OF THE DRAWINGS

The present disclosure is explained in further detail below on the basis of the exemplary embodiments shown in the figures, as follows.

DETAILED DESCRIPTION

Figure 1:
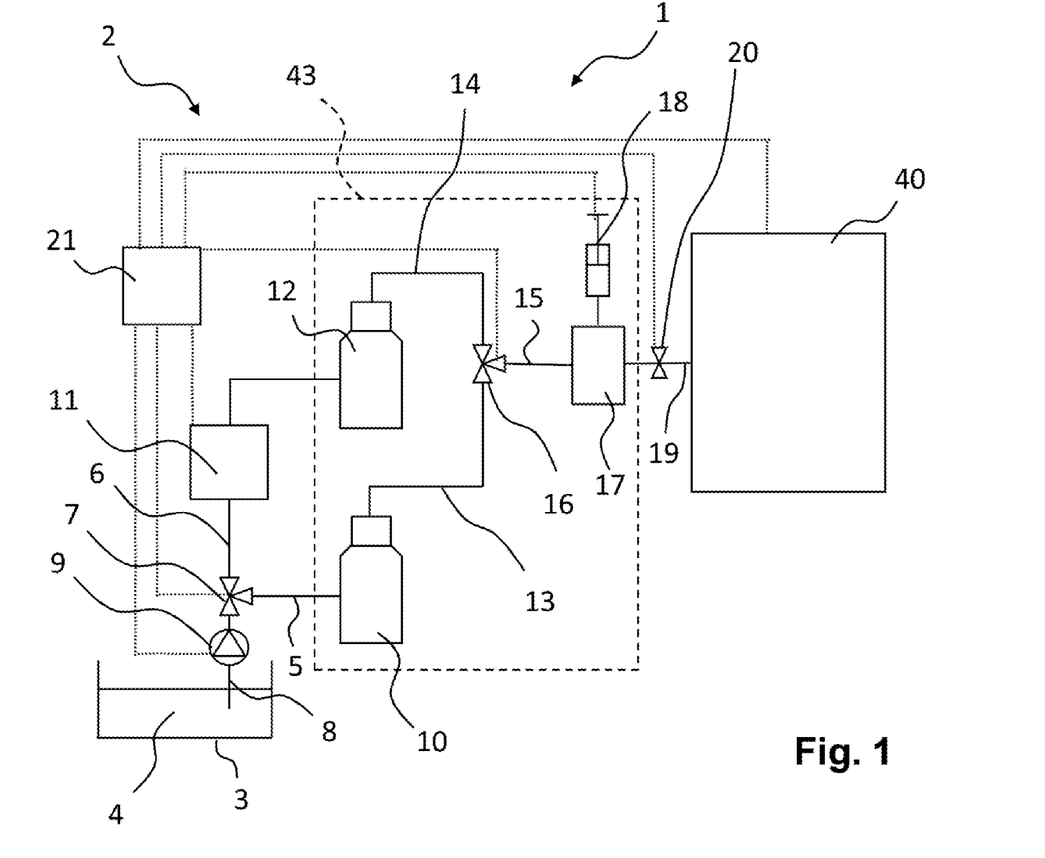
FIG. 1 shows a schematic view of a dilution unit for an automatic measuring device.

FIG. 1 schematically shows an automatic measuring device 1 having a measuring unit 40 and a dilution unit 2 upstream of the measuring unit 40 for diluting a sample liquid 4 taken from a sampling point 3. The sampling point 3 may be, for example, an open body of water, a basin of a water treatment or sewage treatment plant or a process container of a process engineering process. The measuring unit 1 serves to determine values of a parameter that depends on the concentration of at least one analyte contained in the sample liquid 4. The parameter may be, for example, the concentration of a specific substance, e.g., an ion species present in dissolved form in the sample liquid 4 or an organic substance. The parameter may also be a sum parameter to the value of which a plurality of analytes contributes, e.g., the spectral absorption coefficient SAC, the total nitrogen content, the chemical oxygen demand or the total carbon content of the sample liquid 4.

The measuring unit 40 can be partially or completely automated. For example, the measuring unit 40 may be a component of an automatic analysis device, as known for example, from DE 10 2016 105 770 A1. Alternatively, the measuring unit 40 may have a flow measuring cell and a measuring probe arranged therein which determines a parameter of the diluted sample liquid supplied by the dilution unit 2 to the flow measuring cell. The measuring probe may have, for example, an electrochemical or optical, for example, photometric or spectrometric, sensor. The measuring unit 40 may also comprise a chromatography device which serves to isolate a fraction comprising the analyte for a subsequent qualitative or quantitative analysis.

The dilution unit 2 has a first sample liquid line 5 and a second sample liquid line 6 which in the present example are connected via a three-way valve 7 to a third sample liquid line 8. The third sample liquid line 8 connects the first sample liquid line 5 and the second sample liquid line 6 to the sampling point 3. Alternatively, it is also conceivable for the first and second sample liquid lines 5, 6 to be each connected directly to the sampling point 3. In this case, the three-way valve 7 is omitted. Instead of the three-way valve 7, a simple T-piece may connect the first and second sample liquid lines 5, 6 to the third sample liquid line 8. A pump 9 serves to convey the sample liquid 4 from the sampling point 3.

In order to set different flow rates for the sample liquid 4 through the first sample liquid line 5 and the second sample liquid line 6, pumps with different pumping rates arranged in the first and in the second sample liquid lines 5, 6 may be used in an alternative embodiment.

In the present example, the first sample liquid line 5 opens into a first collecting container 10 for sample liquid 4. The second sample liquid line 6 is fluidly connected to a separator 11. The separator 11 is designed to obtain from the sample liquid 4 supplied to it a dilution liquid which is substantially free of an analyte to be subsequently determined qualitatively or quantitatively by means of the measuring device 1. This can be done by means of a physical, e.g., thermal or mechanical, or by means of a chemical separation method. Examples are given below with reference to FIGS. 2a, 2b and 2c.

The separator 11 is fluidly connected to a second collecting container 12 in order to transport dilution liquid obtained from the sample liquid 4 to the second collecting container 12. The separator may comprise a pump (not shown in FIG. 1) for this purpose.

The first and the second collecting containers 10, 12 are components of a mixing device 43 of the dilution unit 2. The dilution unit 2 further comprises liquid lines 13, 14, 15, a mixing unit 17 and a piston pump 18.

The first and the second collecting containers 10, 12 are fluidly connected to a mixing unit 17 via the liquid lines 13, 14, 15 and a three-way valve 16 which connects the liquid lines 13, 14, 15 to one another. In the example shown here, the mixing unit 17 has a mixing container which is connectable to the piston pump 18. Depending on the position of the three-way valve 16, liquid may be transported from the first collecting container 10 or from the second collecting container 12 to the mixing container by means of the piston pump 18. The mixing unit 17 may comprise means for actively mixing the liquid taken from the collecting containers 10 and 12, e.g., a stirrer or means for passive mixing, e.g., structures which cause turbulence of the liquids guided into the mixing unit 17 when they flow into the mixing unit 17.

The mixing unit 17 is fluidly connected to the measuring unit 40 via a liquid line 19 and a valve 20. In the example shown here, the measuring unit 40 comprises a pump (not shown in FIG. 1) which, when the valve 20 is open, can withdraw diluted sample liquid from the mixing unit 17 via the liquid line 19.

In the present example, the dilution unit 2 has an electronic controller 21 which serves to control the dilution unit 2 when producing diluted sample liquid. The electronic controller 21 may comprise a microcontroller and associated memory storing operating programs of the dilution unit 2 that are executed by the microcontroller. The electronic controller 21 is connected to the pumps 9, 18, the valves 7, 16, 19 and the separator 11 in order to actuate them automatically in accordance with the respectively currently executed operating program.

In the present exemplary embodiment, the measuring unit 40 also has a measuring and control electronics (not specifically shown in FIG. 1) which is designed to communicate with the controller 21 of the dilution unit 2. In this way, it is possible for the measuring and control electronics to adjust the operation of the dilution unit 2 to the measuring operation of the measuring unit 40. In an alternative embodiment, the measuring and control electronics of the measuring unit 40 can also completely assume the control of the dilution unit 2. In this case, the separate controller 21 is omitted.

The method for diluting the sample liquid 4 taken from the sampling point 3 takes place as follows: First, sample liquid 4 is transported by means of the pump 9 via the first sample liquid line 5 to the first collecting container 10. Beforehand, simultaneously or subsequently, sample liquid 4 is transported via the second sample liquid line 6 to the separator 11 by means of the pump 9. There, a dilution liquid is obtained from the sample liquid 4 by separating at least the analyte, for example, by distillation, condensation of vapor discharged from the sample liquid, e.g., water vapor, or by means of an ion exchanger if the analyte is an ion. The obtained dilution liquid which is substantially free of analyte is transported from the separator 11 to the second liquid container 12.

In cooperation with the valve 16, the piston pump 18 transports sample liquid from the first liquid container 10 and dilution liquid from the second liquid container 12 to the mixing unit 17. The piston pump 18 is controlled such that a predetermined dilution ratio is reached. The dilution ratio 18 can be predetermined by the controller 21 and/or by the measuring unit 40. The dilution liquid and the sample liquid are mixed in the mixing unit 17 at the predetermined dilution ratio. The diluted sample liquid thus obtained is then transported from the mixing unit to the measuring unit 40.

Part of the method steps or all method steps can be performed automatically by the controller 21. In the present example, the controller 21 controls all method steps until the diluted sample liquid is produced in the mixing unit 17. The final step, namely removing the diluted sample liquid from the mixing unit and transporting the diluted sample liquid to the measuring device, is carried out by a pump of the measuring unit 40 which pump is controlled by the measuring and control electronics of the measuring unit 40.

Figure 2A:
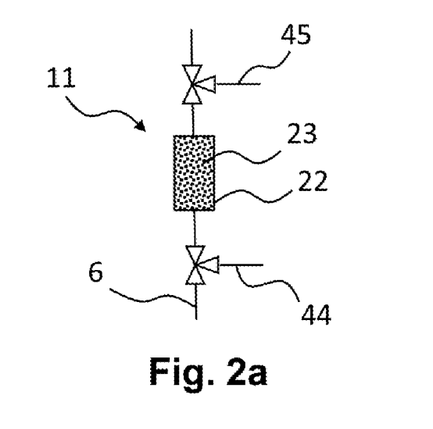
FIG. 2a shows a schematic view of a first example of a separator of the dilution unit according to FIG. 1.
Figure 2B:
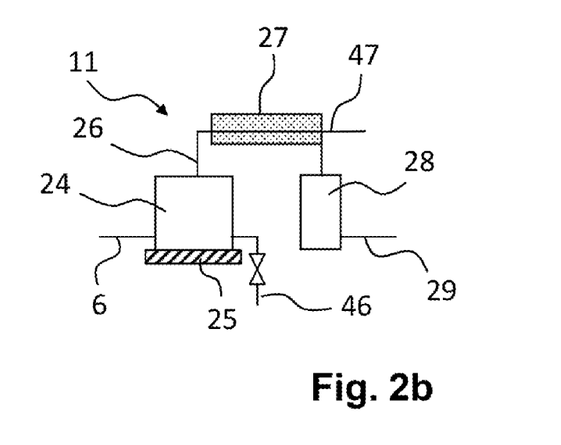
FIG. 2b shows a schematic view of a second example of a separator of the dilution unit according to FIG. 1.
Figure 2C:
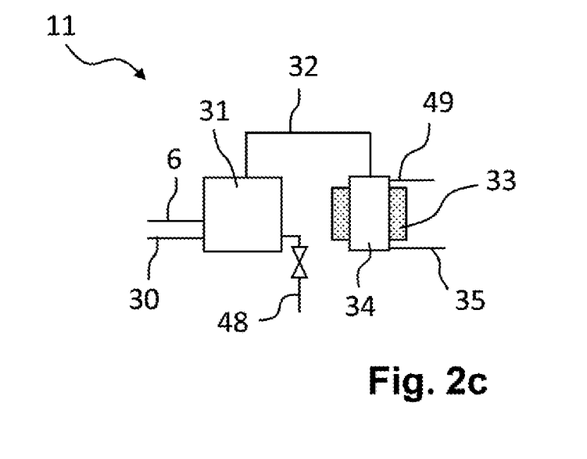
FIG. 2c shows a schematic view of a third example of a separator of the dilution unit according to FIG. 1.

Various possible exemplary embodiments for the separator 11 are schematically shown in FIGS. 2a, 2b and 2c.

According to a first exemplary embodiment of FIG. 2a, the separator 11 comprises a container 22 fluidly connected, on the one hand, to the second sample liquid line 6 and, on the other hand, to the second collecting container 12 and containing an ion exchanger 23. This embodiment of the separator 11 can be advantageously used if the analyte is an ion. In this case, during passage of the sample liquid 4 from the second sample liquid line 6 to the second collecting container 12 through the container 22, the analyte is sorbed by the ion exchanger 23 and is thus removed from the sample liquid. Therefore, a liquid which substantially no longer contains the analyte and which can serve as dilution liquid for dilution of the sample liquid 4 contained in the first collecting container 10 arrives in the collecting container 12. If the analyte is, for example, ammonium, zeolite can serve as ion exchanger 23. The ion exchanger 23 can be regenerated at regular intervals with a regeneration solution, e.g., a concentrated saline solution. To this end, a first branch is arranged in the sample liquid line 6 upstream of the container 22 and fluidly connects a supply line 44 for the regeneration solution to the sample liquid line 6 and the container 22. A second branch is arranged downstream of the container 22 in the connection line between the container 22 and the second collecting container 12 and fluidly connects a discharge line 45 for the regeneration solution to the connection line and the container 22. In order to regenerate the ion exchanger 22, the supply line 44 for the regeneration solution can be fluidly connected to the container 22 instead of the sample liquid line 6. Likewise, the liquid path between the container 22 and the second collecting container 12 can be blocked and the container 22 can be fluidly connected instead to a discharge line 45 for the regeneration solution. Automatically controllable valves are used for this purpose which can be actuated, for example, by the controller 21. The regeneration solution can then be directed via the supply line 44 through the container 22 into the discharge line 45.

According to a second exemplary embodiment in FIG. 2b, the separator 11 comprises a distillation apparatus. In the example shown here, this distillation apparatus has a heatable vessel 24, e.g., a container or a pipeline section, whose wall is at least partially in contact with a heater 25, e.g., a resistance heater. On the one hand, the vessel 24 is fluidly connected to the second sample liquid line 6. On the other hand, it has a discharge line 26 for gas and for vapor formed from the heated sample liquid. This discharge line 26 is in contact, at least in one section, with a cooler 27, e.g., a Peltier cooler, a heat pipe or a fluid cooling system. The fluid cooling system can use liquid or gas, for example, air, as cooling medium. A condensate container 28, e.g., a container or a pipeline section, for receiving liquid condensed out of the cooled vapor and gas is arranged downstream of the cooled section of the discharge line 26. The cooled vapor is discharged from the cooled section of the discharge line 26 via a discharge line 47 and is thus separated from the condensate.

The condensate container 28 is fluidly connectable to the second collecting container 12 via the discharge line 29. The vessel 24 has a discharge line 46 via which the distillation bottom remaining in the vessel 24 may be discharged.

In this embodiment, the separator 11 may, for example, be used for sample liquids on an aqueous basis, e.g., water, waste water, and drinking water samples. With the separator in this embodiment, water can be separated from the sample liquid by distillation and subsequent condensation and used as dilution liquid. In this case, the analyte remains in the residue of the distillation, i.e. in the vessel 24. In a modification, the separator may also be designed to carry out fractional distillation with a plurality of condensate containers for the different fractions.

In a third embodiment schematically shown in FIG. 2c, the separator 11 may comprise an apparatus for discharging gas or vapor from the sample liquid and for subsequent condensation of a dilution liquid from the gas or the vapor. In this variant, the separator 11 has a vessel 31 into which the second sample liquid line 6 and a gas supply line 30 open. The vessel 31 is moreover connected to a condensate container 34 via another fluid line 32. At least one part of the wall of the condensate container 34 is in contact with a cooler 33, e.g., a Peltier cooler, a heat pipe or a fluid cooling system. The condensate container 34 also has a gas discharge line 49 and a liquid discharge line 35 fluidly connected or connectable to the second collecting container 12. The vessel 31 and the condensate container 34 may be configured, for example, as a container or as pipeline sections.

By introducing gas, e.g., nitrogen or air, into the sample liquid 4 contained in the vessel 31, vapor, e.g., water vapor, may be discharged from the sample liquid 4. The vapor is discharged from the vessel 31 together with the gas via the fluid line 32 and transported to the cooled condensate container 34 where the vapor condenses. The analyte-free condensate thus formed may be transported as dilution liquid to the second collecting container 12 via the liquid discharge line 35. The cooled gas exits the condensate container 34 via the gas discharge line 49. Optionally, a heater may be provided for the gas supply line 30 or for the vessel 31. Over time, the residue in the vessel 31 is concentrated more and more and may be discharged from time to time via a line 48 opening into the vessel 31.

Figure 3:
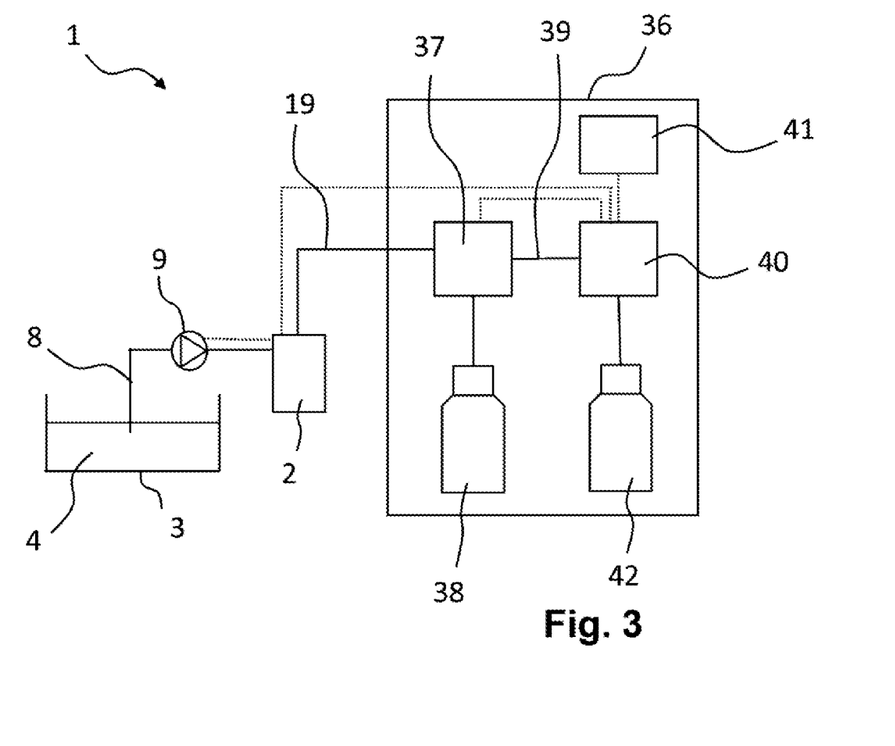
FIG. 3 shows a schematic view of an automatic analysis device with an upstream separator according to FIG. 1.

FIG. 3 schematically shows an exemplary embodiment for a measuring device 1 having an automatic analysis device 36 comprising the measuring unit 40 and having the dilution unit 2 upstream of the analysis device 36. The dilution unit 2 is designed as already described in detail with reference to FIG. 1.

The analysis device 36 comprises a supply line 19 for diluted sample liquid that fluidly interconnects the dilution unit 2 and a dosing unit 37 of the analysis device 36. As already explained with reference to FIG. 1, the dilution unit 2 is connected to the sampling point 3 via the third sample liquid line 8 and the pump 9. Sample liquid 4 taken from the sampling point 3 via the sample liquid line 8 is diluted by means of the dilution unit 2 in the manner described and supplied to the analysis device 36 via the supply line 19.

The dosing unit 37 of the analysis device 36 is configured to measure a specific quantity of the diluted sample liquid. The analysis device 36 further comprises one or more liquid containers 38 for one or more reagents. The reagent or reagents are intended to be added to the sample liquid to effect a chemical reaction resulting in an optically detectable reaction product. The quantity of reaction product formed is a measure of the concentration of the analyte in the sample liquid 4. The dosing unit 37 is configured to withdraw and dose specific quantities of the reagent or reagents from the liquid container or containers 38 and to add them to the diluted sample liquid. To this end, the dosing unit 37 may have means for transporting and dosing liquids which include liquid lines, one or more controllable pumps and one or more controllable valves. It may be, for example, designed to be quite analogous to the dosing unit described in DE 10 2016 105 770 A1.

In the present exemplary embodiment, the measuring unit 40 is designed as an optical measuring unit of the analysis device 36. It serves to determine the concentration of the optically detectable reaction product in the reaction mixture formed from the sample liquid and the reagents and to determine therefrom a value of the parameter of the sample liquid to be determined. To this end, the optical measuring unit 40 may comprise a measuring cell for receiving the reaction mixture, an optical, for example, spectrometric or photometric, sensor and electronic measuring and control electronics. The photometric sensor may have a radiation source and a radiation detector arranged with respect to a transparent wall of the measuring cell such that radiation from the radiation source passes through the measuring cell and the reaction mixture contained therein and then impinges on the radiation detector. The radiation source may comprise one or more light-emitting diodes and the radiation detector may comprise one or more photodiodes or other detector elements. The radiation intensities detected by the detector and the electrical measurement signals of the detector corresponding to the radiation intensities are a measure of the absorption or extinction of the measuring radiation emitted by the radiation source in the reaction mixture containing the optically detectable reaction product and thus also a measure of the concentration of the reaction product or the value of the parameter of the sample liquid 4 correlated therewith.

The measuring and control electronics may comprise a microprocessor and associated memory storing operating programs of the analysis device 36 which the microprocessor executes to control the analysis device 36 and to determine values of the parameter. Electrical signals of the radiation detector which depend on the radiation intensity received, are supplied to the measuring and control electronics and processed by the latter in order to determine values of the parameter, e.g., using stored calibration information.

The analysis device 36 further comprises one or more interfaces 41 which are connected to the measuring and control electronics of the measuring unit 40. The interface 41 may, for example, be a human-machine interface (HMI) in the form of a display with input means, such as keys or a touch screen. The interface 41 may, additionally or alternatively, be a data interface for communication with an external operating device, e.g., a tablet PC or a smartphone, or with a higher-level process control center.

In the present exemplary embodiment, the measuring and control electronics of the measuring unit 40 is connected to the controller of the dilution unit 2 and serve to synchronize the operation of the dilution unit 2 with the measuring operation of the analysis device 36. The measuring and control electronics is moreover used for automatically controlling the analysis device 36 to determine values of the parameter of the sample liquid. The measuring and control electronics thus controls the dosing unit 37, for example, the pumps and valves thereof, for dosing the liquids involved. Furthermore, the measuring and control electronics controls the optical sensor of the measuring unit 40 and process the measured data of the sensor in the aforementioned manner.

The measuring cell of the measuring unit 40 is fluidly connected to a collecting container 42 for spent liquids. Spent reaction mixture may be discharged from the measuring cell into the collecting container 42.

A method for determining a value of a parameter which depends on the concentration of at least one analyte in the sample liquid 4 by means of the analysis device 36 takes place in the following manner. Without being explicitly mentioned each time, each method step is carried out as controlled by the controller of the dilution unit 2 and/or by the measuring and control electronics of the analysis device 36.

Sample liquid 4 is first removed from sampling point 3 and diluted by means of the dilution unit 2 according to the method described above. The diluted sample liquid is supplied to the analysis device 36. The dosing unit 37 of the analysis device 36 measures a quantity of the diluted sample liquid which can be predetermined by the measuring and control electronics of the analysis device 36 and adds to it quantities, also predetermined by the measuring and control electronics, of one or more reagents from the one or more storage containers 38. To this end, the dosing unit 37 successively doses the predetermined quantities of liquid into the measuring cell of the optical measuring unit 40. A measurement signal is detected by means of the optical sensor there and evaluated by the measuring and control electronics pursuant to a stored computing rule based on calibration data in order to determine a value of the parameter of the sample liquid. This value is output and/or displayed via the interface 41. The spent liquid is then discharged into the collecting container 42.

In the present exemplary embodiment, the dosing unit 37 is designed to successively direct the measured quantity of the diluted sample liquid and the correspondingly measured quantities of the reagents into the measuring cell of the measuring unit 40. In an alternative embodiment, it is also possible for the dosing unit 37 to comprise a mixing container and to be designed to first transport the diluted sample liquid and the reagents to the mixing container in order to produce the reaction mixture and to then direct the latter into the measuring cell of the measuring unit 40. A multitude of further variants and exemplary embodiments of the present disclosure are conceivable.

The invention claimed is:

1. A method for diluting a sample liquid taken from a sampling point of an environmental or industrial process for subsequent determination of a parameter that depends on a concentration of at least one analyte in the sample liquid, the method comprising:
   supplying a first quantity of the sample liquid to a mixing device via a first sample liquid line;
   supplying a second quantity of the sample liquid to a separator via a second sample liquid line, wherein the first quantity and the second quantity are supplied from the sampling point;
   separating at least the at least one analyte from the second quantity of the sample liquid supplied to the separator using the separator to generate a dilution liquid that is substantially free of the at least one analyte;
   mixing at least one portion of the first quantity of the sample liquid supplied to the mixing device via the first sample liquid line with at least one portion of the dilution liquid using the mixing device; and
   subsequently determining at least one measured value of the parameter of the sample liquid, which depends on the concentration of the at least one analyte in the sample liquid.

2. The method of claim 1, wherein the first quantity of the sample liquid flows through the first sample liquid line with a first mass or volume flow rate, and wherein the second quantity of the sample liquid flows through the second sample liquid line with a second mass or volume flow rate that is different from the first mass or volume flow rate.

3. The method of claim 1, wherein the separating of at least the at least one analyte from the second quantity of the sample liquid is effected using a physical or chemical method.

4. The method of claim 3, wherein the physical method is a thermal method or a mechanical method.

5. The method of claim 1, wherein the separating of at least the at least one analyte from the second quantity of the sample liquid is effected by distillation.

6. The method of claim 1, wherein the sample liquid contains water, and the at least one analyte is dissolved and/or suspended in the water, and wherein the separating of the at least one analyte from the second quantity of the sample liquid comprises:
   discharging water vapor from the sample liquid; and
   cooling the water vapor to form condensate, the condensate serving as the dilution liquid.

7. The method of claim 1, wherein the separating of at least the at least one analyte comprises passing the sample liquid through an ion exchanger configured such that the at least one analyte is sorbed by the ion exchanger, wherein liquid exiting the ion exchanger after passing therethrough is the dilution liquid.

8. The method of claim 1, the method further comprising:
   storing the dilution liquid in a container, wherein the at least one portion of the dilution liquid used in the mixing device is from the container.

9. A method for determining a parameter of a sample liquid which depends on a concentration of at least one analyte in the sample liquid, the method comprising:
   taking sample liquid from a sampling point of an environmental or industrial process;
   preparing diluted sample liquid, wherein the preparing comprising:

supplying a first quantity of the sample liquid to a mixing device via a first sample liquid line;

supplying a second quantity of the sample liquid to a separator via a second sample liquid line;

separating at least the at least one analyte from the second quantity of the sample liquid supplied to the separator using the separator to generate a dilution liquid that no longer contains the at least one analyte; and mixing at least one portion of the first quantity of the sample liquid supplied to the mixing device via the first sample liquid line with at least one portion of the dilution liquid to produce a diluted sample liquid using the mixing device;

transporting at least one portion of the diluted sample liquid to a measuring unit; and determining at least one measured value of the parameter using the measuring unit.

10. The method of claim 9, further comprising:

producing a reaction mixture from the at least one portion of the diluted sample liquid and at least one reagent;

generating a measurement signal that represents a measured variable of the reaction mixture correlated with the parameter to be determined using the measuring unit; and deriving the measured value of the parameter from the measurement signal.

11. The method of claim 9, wherein all the method steps are performed in an automated manner using a control electronics.

12. A dilution unit for a measuring device for determining measured values of a parameter that depends on a concentration of at least one analyte in a sample liquid, the dilution unit comprising:

a first sample liquid line that is fluidly connectable to a sampling point containing the sample liquid;

a second sample liquid line that is fluidly connectable to the sampling point, wherein the sampling point is in an environmental or industrial process;

a separator fluidly connected to the second sample liquid line and configured to separate the at least one analyte from sample liquid supplied to the separator via the second sample liquid line to produce a dilution liquid that is substantially free of the at least one analyte, wherein the separator includes a container;

an outlet fluidly connected to the container and configured to enable discharge of the dilution liquid;

a mixing device fluidly connected to the outlet of the container and to the first sample liquid line; and means for transporting sample liquid to the separator, for transporting dilution liquid from the separator, and for transporting sample liquid from the sampling point to the mixing device.

13. The dilution unit of claim 12, wherein the separator includes:

a gas discharge line connecting the container to a condensation unit.

14. The dilution unit of claim 13, wherein the container is a heatable container.

15. The dilution unit of claim 13, wherein the condensation unit includes:

a cooler configured for cooling gas supplied from the condensation unit via the gas discharge line; and a condensate container configured for collecting condensate from the cooled gas, wherein the condensate container is fluidly connectable to the mixing device as to supply the condensate thereto as dilution liquid.

16. The dilution unit of claim 13, wherein the separator further includes a gas supply line opening into the container.

17. The dilution unit of claim 13, wherein the gas supply line is a heatable gas supply line.

18. The dilution unit of claim 13, wherein the separator includes a heater configured to interact with the container.

19. The dilution unit of claim 13, wherein the at least one analyte is an ion, and wherein the separator includes an ion exchanger fluidly connected to the second sample liquid line and the outlet and configured for sorbing the at least one analyte.

20. An automatic measuring device for determining measured values of a parameter that depends on a concentration of at least one analyte in a sample liquid, the measuring device comprising:

a dilution unit comprising:

a first sample liquid line that is fluidly connectable to a sampling point containing the sample liquid;

a second sample liquid line that is fluidly connectable to the sampling point, wherein the sampling point is in an environmental or industrial process;

a separator fluidly connected to the second sample liquid line and configured to separate the at least one analyte from sample liquid supplied to the separator via the second sample liquid line to produce a dilution liquid that is substantially free of the at least one analyte, wherein the separator includes a separator container;

an outlet fluidly connected to the separator container and configured to enable discharge of the dilution liquid;

a mixing device fluidly connected to the outlet of the separator and to the first sample liquid line, the mixing device configured to produce a diluted sample liquid by mixing at least one portion of the sample liquid from the first sample liquid line with at least one portion of the dilution liquid from the separator; and means for transporting sample liquid to the separator, for transporting dilution liquid from the separator, and for transporting sample liquid from the sampling point to the mixing device;

a measuring unit configured to detect a measured value of the parameter;

means for transporting diluted sample liquid from the dilution unit to the measuring unit; and a control electronics configured to control the measuring device for performing the method according to claim 9.

21. The measuring device of claim 18, further comprising:

a reagent container holding a reagent to be added to the diluted sample liquid to produce a reaction mixture; and means for transporting the reagent from the reagent container to the measuring unit.

\* \* \* \* \*